United States Patent [19]

Okura

[11] Patent Number: 4,676,470

[45] Date of Patent: Jun. 30, 1987

[54] HOOK DEVICE FOR TELEPHONE WIRE CLAMPS

[76] Inventor: Masahiko Okura, 12-7, 4-Chome, Siroganedai, Minatoku, Tokyo, Japan

[21] Appl. No.: 848,759

[22] Filed: Apr. 7, 1986

[51] Int. Cl.⁴ .............................................. B42F 13/00
[52] U.S. Cl. .................................... 248/341; 248/499; 410/101
[58] Field of Search .................. 248/499, 65, 63, 341, 248/58, 677, 500, 503, 300, 339, 304; 24/115 K, 265 CD, 265 AL; 403/232.1, 398; 410/101, 97, 106, 116

[56] References Cited

U.S. PATENT DOCUMENTS

| D. 274,786 | 7/1984 | de Vos | D8/373 |
|---|---|---|---|
| 1,621,076 | 3/1927 | Lotz | 24/265 AL |
| 2,078,591 | 4/1937 | Sprague | 24/265 CD |
| 3,302,912 | 2/1967 | Hurlburt, Jr. | 248/65 |
| 3,404,438 | 10/1968 | Goldman | 24/265 |
| 3,893,399 | 7/1975 | Lewis et al. | 24/115 K X |
| 4,297,962 | 11/1981 | Johnson, Jr. | 248/499 X |

FOREIGN PATENT DOCUMENTS

| 2342570 | 9/1977 | France | 248/65 |
| 303911 | 1/1929 | United Kingdom | 410/97 |

*Primary Examiner*—Robert W. Gibson, Jr.
*Assistant Examiner*—David L. Talbott
*Attorney, Agent, or Firm*—Moonray Kojima

[57] ABSTRACT

Disclosed herein is a hook device comprising two members of a base plate and a suspending ring having respectively a quite simple and easily made form, the latter being mounted on the cut and raised frame portions of the former in loosely suspending and in unturned relation through a quite easy means.

4 Claims, 6 Drawing Figures

U.S. Patent  Jun. 30, 1987  4,676,470
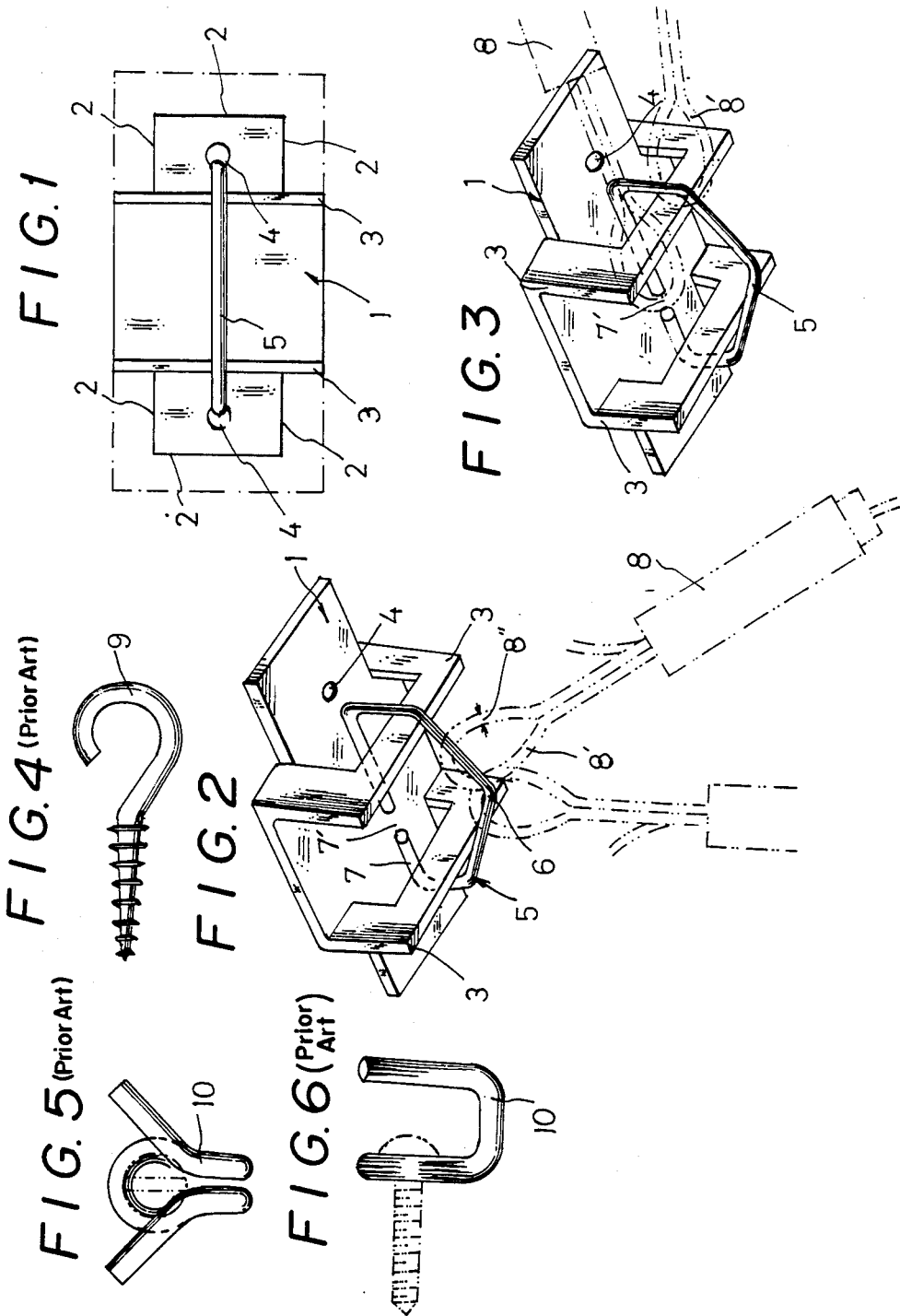

HOOK DEVICE FOR TELEPHONE WIRE CLAMPS

BACKGROUND OF THE INVENTION

With regard to hooks used for suspending the suspending ring portion of telephone wire clamps to anchor the clamps to some desired structure or the like, various things have, heretofore, been disclosed, say 9 in FIG. 4, 10 in FIGS. 5 and 6. In all such conventional ones, however, coming-off of the clamp from the hook have often occurred by swinging in the use time, although such conventional ones are advantageous in their simplification and cost saving. Further, the conventional hooks have a defect that those are unable to receive in plural suspending ring portions of the clamps because of the superposed condition of the ring portions in the receiving time which causes more coming-off chances.

SUMMARY OF THE INVENTION

The hook device of this invention comprises a base plate provided with a pair of suspending frames made by means of cutting and raising work of a substantially square metal plate and a suspending ring made of a wire and mounted on the frame members in loosely suspending and unturned relation. Those two members have relatively a quite simple form and are easily assembled to assure a quite certain suspension.

BRIEF DESCRIPTION OF THE DRAWING

FIG. 1 is plan view of a preferred embodiment of the invention;

FIG. 2 is a perspective view of the same in the use time;

FIG. 3 is a perspective view showing a suspending procedure of the suspending ring portion 8' of the wire clamp 8 to the ring 5;

FIG. 4 is a side elevational view of a conventional hook;

FIG. 5 is a front elevational view of another conventional hook;

FIG. 6 is a side elevational view of the hook of FIG. 5.

DESCRIPTION OF THE PREFERRED EMBODIMENT

In FIGS. 1-3, 1 is a base plate provided with a pair of cut and raised suspending frames 3, 3 made by means of raising vertically the outside margin portions along the substantially ] -form cut lines 2 formed symmetrically in the right and left direction. 4, 4 are bores for fasteners (not shown) used for fixing the base plate to a desired structure or the like (not shown). The bores 4, 4 may be only one located in the center of the base plate. 5 is a suspending ring made of a thickish wire and has a substantially square form in its contour, the front side 6 of which is formed into a mountain-shape, while the rear side 7 of the same has a discontinued portion 7' having an interval at least larger than the thickness (or diameter) 8" of the suspending ring portion 8' of the wire clamp 8. The suspending ring member 5 is adapted to be mounted on the two frames 3, 3 in loosely suspending and unturned relation. Stated particularly, the gap interval between two members are settled as such that it is larger than the thickness 8" of the suspending ring portion 8' of the wire clamp 8 and is smaller than the size permitting the ring 5 to turn on the frames 3, 3.

In operation, the suspending ring portion 8' of the wire clamp 8 may be suspended onto the ring 5 at the mountain-shaped side 6 of the ring 5 after passing through the discontinued portion 7' and the gap between the frame 3 and the ring 5 as shown in FIG. 3.

Inasmuch as the invention is constructed as mentioned above, there is, ordinarily, no fear for the wire clamp 8 to come off from the ring 5 except intentional cases. Further, since both the base plate 1 and the ring 5 have respectively a quite simple form to be made at small cost, and yet assemblage of those elements may be achieved quite easily with applying an appropriate pressing means to the ring 5, it is by no means inferior to the conventional hooks even in view of the simplicity and low cost. Still further, it is obvious that the present device is receivable plural wire clamps at the same time without any trouble.

I claim:

1. A hook device for holding an eyelet ring, comprising a flat rectangular base comprising at least one flat surface and two oppositely disposed side portions;
    a pair of square "U" shaped frames, each comprising a pair of parallel standards connected by a cross member perpendicular to said standards, said standards being connected to opposite side portions of said base, wherein a space is formed between the cross member and the flat surface of said base and between the two standards of each frame, said space being suitable for insertion therethrough of said eyelet ring, and wherein the frames are disposed parallel to each other and at a suitable distance from each other for holding said eyelet ring therebetween; and
    a suspension member comprising two parallel side members, each connected at one end thereof to a "V" shaped member, and at the other end thereof by members extending toward each other with a space therebetween of sufficient dimension for insertion therebetween of said eyelet ring, wherein each of said extended members is held within said space of a respective frame and against said connecting member of the frame with said parallel side members being disposed parallel to the connecting member and perpendicular to the flat surface of said base, and with the bottom of said "V" shaped member for holding the eyelet ring, whereby said eyelet ring is inserted through said space of said frame, then between the two extended members of said suspension member, then placed on one extended member, and moved along said extended member, then moved along one said parallel member, and then moved to the bottom of the "V" shaped member whereat the eyelet ring is held.

2. A hook device according to claim 1 wherein said base plate has at least one bore (4) for fastener use.

3. The device of claim 1, wherein said frame and said base are formed from a rectangular flat plate with the frame being cut out of the outer portion of the plate and bent to a perpendicular position with respect to the remaining base.

4. The device of claim 1, wherein the base is fixed with the frame extending downward with the "V" shaped suspension member facting downward.

* * * * *